United States Patent Office 3,244,775
Patented Apr. 5, 1966

3,244,775
BIS(DIALKYL)PHENYLENE PHOSPHORO-
DITHIOATES
Sidney B. Richter, Chicago, Ill., assignor to Velsicol
Chemical Corporation, Chicago, Ill., a corporation of
Illinois
No Drawing. Filed Apr. 25, 1962, Ser. No. 189,973
16 Claims. (Cl. 260—930)

This invention relates to the production of new pesticidal compositions of matter. More specifically, this invention relates to alkyl esters of phenylene phosphorothioic acids in which the alkyl group is an unsubstituted lower alkyl group and the phenylene ring is substituted with from 0 to 2 halogen atoms, from 0 to 1 unsubstituted lower alkyl group, from 0 to 1 unsubstituted lower alkoxy group, from 0 to 1 nitro group, and from 0 to 1 lower unsubstituted alkylmercapto group, the phenylene ring always being substituted in at least one position with a substituent other than a lower alkyl group. These new compounds are useful in the control of pests such as insects and fungi.

Preferred new chemical compounds of this invention can be represented by the following general formula

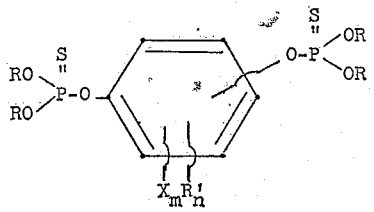

in which R is an unsubstituted lower alkyl group, X is halogen, R' is an unsubstituted lower alkyl group, an unsubstituted lower alkoxy group, a nitro group, or a lower unsubstituted alkylmercapto group, $m$ is a whole number from 0 to 2, and $n$ is a whole number from 0 to 1, the sum of $m$ and $n$ being at least one and $m$ is at least 1 when R' is alkyl. By lower alkyl, lower alkoxy, or lower alkylmercapto groups are meant those containing up to four carbon atoms.

The new compounds of this invention can be prepared by the condensation of substituted dihydroxybenzenes with unsubstituted lower alkyl phosphorochloridothioates $(RO)_2PSCl$, in which R is as defined above. At least two moles of the alkyl phosphorochloridothioate should be used for each mole of substituted dihydroxybenzene, but in practice it is preferred to use an excess of the alkyl phosphorochloridothioate. The condensation reaction can be facilitated by the addition of suitable acid scavengers such as anhydrous potassium carbonates for sodium carbonate. The reaction also facilitated by the use of a solvent such as acetone, benzene or xylene. The reaction temperature is not critical, but temperatures which are the normal reflux temperature of the reaction mixture are preferred. The reaction is ordinarily carried out at normal atmospheric pressure, but sub- or super-atmospheric pressure can also be used if desired.

The course of the reaction can be followed conveniently by infrared spectrophotometric analysis, for example; and good yields of product are generally obtained in 15 to 20 hours of reaction time. The product can be isolated by filtering off the inorganic solids and distilling off the solvent and any unreacted alkyl phosphorochloridothioate. The residue so obtained will often be sufficiently pure for pesticidal use; but it can be purified by any recognized technique known to the art, such as chromatography, recrystallization, or fractional distillation.

Suitable unsubstituted lower alkyl phosphorochloridothioates to be used as reactants for preparing the new compounds of this invention are such compounds as methyl phosphorochloridothioate, ethyl phosphorochloridothioate, n-propyl phosphorochloridothioate, isopropyl phosphorochloridothioate, n - butyl phosphorochloridothioate, and the like.

Suitable substituted dihydroxybenzenes to be used as reactants for preparing the new compounds of this invention are the appropriately substituted hydroquinones, resorcinols, or catechols (known also as pyrocatechols). When these substances are used as the starting materials, the resulting new compounds will contain the p-phenylene, m-phenylene, or o-phenylene groups, respectively. By appropriately substituted dihydroxybenzenes are meant those which contain the groups X and R' as defined above. For examples, some suitably substituted hydroquinones include 2,5 - dibromohydroquinone, 2,3 - dichlorohydroquinone, 2,5 - dichlorohydroquinone, 2,6 - dichlorohydroquinone, 2,6-diiodohydroquinone, bromohydroquinone, 2-chloro-5-methoxy-hydroquinone, 2-chloro-6-methoxyhydroquinone, 2-chloro-3-methoxyhydroquinone, 2,6-dibromohydroquinone, 2,3 - dichloro - 5 - methoxyhydroquinone, 2,5 - difluorohydroquinone, methoxyhydroquinone, 2-methoxy-6-propylhydroquinone, tert-butylthiohydroquinone, 5-chloro - 2 - methoxy - 3 - nitrohydroquinone, 5- chloro - 3 - methoxy - 2 - nitrohydroquinone, 2-methoxy - 3 - nitrohydroquinone, 2-methoxy - 6 - nitrohydroquinone, nitrohydroquinone, and the like.

Some suitably substituted resorcinol are 4 - bromoresorcinol, 4 - bromo - 6 - chlororesorcinol, 4 - butyl-6-chlororesorcinol, 2 - chlororesorcinol, 4 - chlororesorcinol, 4 - chloro - 6 - propylresorcinol, 4 - iodoresorcinol, 2,4 - dichloro - 5 - methylresorcinol, 2 - methoxyresorcinol, 4 - methoxyresorcinol, 4,5 - dichloro - 6 - methoxyresorcinol, 2- chloro - 5 - methoxyresorcinol, 2,4 - dichloro - 5 - methoxyresorcinol, 4,6-dichloro - 5 - methoxyresorcinol, 5-methoxy - 2 - methylresorcinol, 5-(butylmercapto)resorcinol, 2,4 - dinitroresorcinol, 5 - (ethylmercapto)resorcinol, 2-methoxy - 4 - nitroresorcinol, 5-methylmercaptoresorcinol, 2 - nitroresorcinol, 5 - propylmercapto resorcinol, 4 - chloro - 6 - nitroresorcinol, 4-ethoxy - 6 - nitroresorcinol, 4 - methoxy - 6 - nitro resorcinol, and the like.

Some suitably substituted catechols are 4 - chlorocatechol, 3,6 - dibromocatechol, 4 - bromocatechol, 3-methoxycatechol, 4 - methoxycatechol, 3 - bromo - 5-tert-butylcatechol, 4 - bromo - 5 - methylcatechol, 3 - chlorocatechol, 3 - bromo - 6 - methoxycatechol, 4 - bromo-3-methoxycatechol, 5 - bromo - 3 - methoxycatechol, 3-ethoxycatechol, 4 - nitrocatechol, 4 - chloro - 5 - nitrocatechol, and the like.

The manner in which typical new compounds of this invention can be prepared is illustrated in the following examples. All temperatures are in degrees centigrade.

EXAMPLE 1

*Preparation of bis(dimethyl) 4,6-dichloro-1,3-phenylene phosphorothioate*

A mixture of 4,6-dichlororesorcinol (10.45 g.; 0.0585 mole), potassium carbonate (17.8 g.; 0.1287 mole), and 250 ml. benzene was brought to reflux temperature; and methyl phosphorochloridothioate (20.6 g.; 0.1287 mole) was added dropwise with stirring over a period of 20 minutes. The mixture was refluxed for 17 hrs., filtered, shaken twice with 1 M KOH, dried over sodium sulfate, and filtered. The solution was treated with with Nuchar CN, filtered, and stripped of solvent, first with an aspirator and then with a vacuum pump. The filtered liquid solidified to a solid, which was taken up in 8 ml. acetone and chilled to give 2.3 g. of crude product, M.P. 65–70°. Recrystallization from methanol gave 0.89 g. of white bis(dimethyl) 4,6-dichloro-1,3-phenylene phosphorthioate, M.P. 70.5–73°.

Analysis for $C_{10}H_{14}Cl_2O_6P_2S_2$—Theory: Cl, 16.60%; S, 15.03%; P, 14.50%. Found Cl, 16.60%; S, 14.58%; P, 14.40%.

EXAMPLE 2

*Preparation of bis(diethyl) 2,5-dichloro-1,4-phenylene phosphorothioate*

A mixture of 2,5-dichlorohydroquinone (6.32 g.; 0.0441 mole), potassium carbonate (13.40 g.; 0.0970 mole), and 150 ml. acetone was treated dropwise over a period of about 5 min. with ethyl phosphorochloridothioate (18.30 g.; 0.09702 mole). The mixture was stirred and refluxed for 3.5 hrs, and the acetone was stripped under reduced pressure. The residue was taken up in benzene, and the solution was washed with aqueous potassium carbonate and then twice with water, dried over sodium sulfate, filtered, and reduced in vacuo to give 15.5 g. of an oily residue, $n$ 24.5/D 1.5153. An 8.5 g. sample of the oil was dissolved in a little pentane and chromatographed on an 18-cm. alumina column with pentane and benzene as the eluants. A 700-ml. pentane fraction and two, 300-ml. 1:1 pentane-benzene fractions were taken. The pentane was stripped from the first benzene fraction, whereupon 4.8 g. of white solid crystallized. The solid was recrystallized from 95% ethanol to give 3.2 g. (combined first and second crops) of bis(diethyl) 2,5-dichloro-1,4-phenylene phosphorothioate, M.P. 40.5–44°.

Analysis for $C_{14}H_{22}Cl_2O_6P_2S_2$—Theory: Cl, 14.67%; S, 13.29%. Found: Cl, 14.46%; S, 13.27%.

EXAMPLE 3

*Preparation of bis(diethyl) 2-chloro-1,4-phenylene phosphorothioate*

A mixture of chlorohydroquinone (7.95 g.; 0.055 mole), potassium carbonate (16.72 g.; 0.121 mole), and 250 ml. acetone was treated dropwise with stirring over a period of 3–4 minutes with ethyl phosphorochloridothioate (22.80 g.; 0.121 mole). The mixture was then stirred and refluxed for 3.75 hrs., filtered, and reduced in vacuo. The residue was taken up in benzene, shaken with aqueous potassium carbonate and then thrice with water, dried over sodium sulfate, filtered, and reduced in vacuo to give 22.9 g. of brown oil.

Since a preliminary analysis of the oil was unsatisfactory, it was treated further with potassium carbonate (8.36 g.; 0.061 mole), ethyl phosphorochloridothioate (11.40 g.; 0.061 mole), and 300 ml. acetone. The reaction mixture was refluxed for 6 hrs. and 20 min. and then worked up as before, except that the benzene extract was washed further with 2 portions of 1 M KOH. Stripping of the benzene in vacuo gave 18.1 g. of oil, which was chromatographed as described in the previous example. The first 300-ml. benzene fraction gave on reduction 5.8 g. of colorless bis(diethyl) 2-chloro-1,4-phenylene phosphorothioate, $n$ 25/D 1.5170.

Analysis for $C_{14}H_{23}ClO_6P_2S_2$—Theory: Cl, 7.91%; S, 14.31%. Found: Cl, 7.96%; S, 14.27%.

EXAMPLE 4

*Preparation of bis(diethyl) 4,6-dichloro-1,3-phenylene phosphorothioate*

A mixture of 4,6-dichlororesorcinol (9.24 g.; 0.0517 mole), potassium carbonate (15.68 g.; 0.1137 mole), and 300 ml. acetone was heated to reflux and treated dropwise over a period of 20 min. with ethyl phosphorochloridothioate (21.40 g.; 0.1137 mole). The mixture was refluxed for 18 hrs., filtered and reduced in vacuo. The residue was taken up in benzene; and the solution was washed twice with aqueous potassium carbonate and once with water, dried over sodium sulfate, filtered, and reduced in vacuo. The last traces of benzene were removed with a vacuum pump to give 20.5 g. (82% of theory) of bis(diethyl) 4,6-dichloro-1,3-phenylene phosphorothioate, $n$ 25/D 1.5230.

Analysis for $C_{14}H_{22}Cl_2O_6P_2S_2$—Theory: Cl, 14.67%; S, 13.29%; P, 12.83%. Found: Cl, 14.41%; S, 13.66%; P, 12.51%.

EXAMPLE 5

*Preparation of bis(dimethyl) 2-chloro-1,4-phenylene phosphorothioate*

A mixture of chlorohydroquinone (9.15 g.; 0.0636 mole), potassium carbonate (19.40 g.), and 250 ml. acetone was heated to reflux and treated dropwise over a period of 25 min. with methyl phosphorochloridothioate (22.66 g.). The mixture was refluxed for 16 hrs., filtered, and reduced in vacuo. The residue was taken up in benzene; and the solution was washed 4 times with aqueous potassium carbonate, dried over sodium sulfate, filtered, and reduced in vacuo. Removal of the final traces of benzene with a vacuum pump gave 14.5 g. (58% of theory) of bis(dimethyl) 2-chloro-1,4-phenylene phosphorothioate, $n$ 25/D 1.5408.

Analysis for $C_{10}H_{15}ClO_6P_2S_2$—Theory: Cl, 9.03%; S, 16.34%; P, 15.78%. Found: Cl, 9.52%; S, 16.59%; P, 15.14%.

EXAMPLE 6

*Preparation of bis(dimethyl) 2,5-dichloro-1,4-phenylene phosphorothioate*

A mixture of 2,5-dichlorohydroquinone (7.80 g.; 0.0544 mole), potassium carbonate (16.50 g.; 0.1196 mole), and 150 ml. acetone was treated dropwise over a period of 5 min. with methyl phosphorochloridothioate (19.20 g.; 0.1196 mole). The mixture was refluxed for 3.5 hrs. and allowed to stand overnight. Before being worked up, it was retreated with additional potassium carbonate, acid chloride, and acetone in the same quantities as above. The acid chloride was dropped in over a period of 4 min., and the mixture was refluxed for 5 hrs.

The reaction mixture was filtered and reduced in vacuo to give a semisolid residue, which was taken up in a large volume of benzene. The benzene mixture was shaken with aqueous potassium carbonate, washed with water, dried over sodium sulfate, filtered, and reduced in vacuo. Portions of the residue were first crystallized from ethanol-water or from benzene-pentane. Finally, all the material, including second crops, was combined and recrystallized from acetone with chilling. The first crop of crystals from acetone was washed with acetone (−50°) and dried to give 1.5 g. of colorless to white bis(dimethyl) 2,5-dichloro-1,4-phenylene phosphorothioate, M.P. 105–107.5°.

Analysis for $C_{10}H_{14}Cl_2O_6P_2S_2$.—Theory: Cl, 16.58%; S, 15.03%; P, 14.50%. Found: Cl, 16.60%; S, 15.07%; P, 13.90%.

A wide variety of other new compounds within the scope of this invention can be prepared in a manner similar to that detailed above. Given in the following examples are the reactants required to give the indicated named compounds of this invention.

EXAMPLE 7

Ethyl phosphorochloridothioate+4 - methoxycatechol =bis(diethyl) 4-methoxy-1,2-phenylene phosphorothioate.

EXAMPLE 8

Isopropyl phosphorochloridothioate+methoxyhydroquinone=bis(diisopropyl) methoxy-1,4-phenylene phosphorothioate.

EXAMPLE 9 n-Propyl phosphorochloridothioate+4 - butyl-6-chlororesorcinol=bis(di-n-propyl) 4-butyl-6-chloro-1,3-phenylene phosphorothioate.

EXAMPLE 10

Butyl phosphorochloridothioate+4 - chloro - 6-propylresorcinol=bis(dibutyl) 4-chloro-6-propyl-1,3-phenylene phosphorothioate.

EXAMPLE 11 sec-Butyl phosporochloridothioate+2,4 - dichloro - 5-methylresorcinol=bis(di-sec-butyl) 2,4-dichloro-5-methyl-1,3-phenylene phosphorothioate.

EXAMPLE 12

Ethyl phosphorochloridothioate+4 - bromo - 5-methylcatechol=bis(diethyl) 4-bromo-5-methyl-1,2 - phenylene phosphorothioate.

EXAMPLE 13

Methyl phosphorochloridothioate+2 - chloro - 5-methoxy-hydroquinone=bis(dimethyl) 2 - chloro - 5-methoxy-1,4-phenylene phosphorothioate.

EXAMPLE 14

Ethyl phosphorochloridothioate+2-chloro-6-methoxyhydroquinone=bis(diethyl) 2-chloro-6-methoxy-1,4-phenylene phosphorothioate.

EXAMPLE 15

Isopropyl phosphorochloridothioate+2-chloro-3-methoxyhydroquinone=bis(diisopropyl) 2-chloro-3-methoxy-1,4-phenylene phosphorothioate.

EXAMPLE 16

Methyl phosphorochloridothioate+2,3 - dichloro - 5-methoxyhydroquinone=bis(dimethyl) 2,3 - dichloro - 5-methoxy-1,4-phenylene phosphorothioate.

EXAMPLE 17

Ethyl phosphorochloridothioate+4,5-dichloro-6-methoxyresorcinol=bis(diethyl) 4,5 - dichloro-6-methoxy-1,3-phenylene phosphorothioate.

EXAMPLE 18

Isopropyl phosphorochloridothioate+2-chloro-5-methoxyresorcinol=bis(diisopropyl) 2 - chloro-5-methoxy-1,3-phenylene phosphorothioate.

EXAMPLE 19

Methyl phosphorochloridothioate+4 - chloro - 5-methoxyresorcinol=bis(dimethyl) 4-chloro-5 - methoxy - 1,3-phenylene phosphorothioate.

EXAMPLE 20

Ethyl phosphorochloridothioate+4-bromo-3-methoxycatechol=bis(diethyl) 4-bromo-3-methoxy-1,2-phenylene phosphorothioate.

EXAMPLE 21

Isopropyl phosphorochloridothioate+2 - methoxy - 6-propylhydroquinone=bis(diisopropyl) 2 - methoxy - 6-propyl-1,4-phenylene phosphorothioate.

EXAMPLE 22

Methyl phosphorochloridothioate+5 - methoxy - 2-methylresorcinol=bis(dimethyl) 5-methoxy-2 - methyl-1,3-phenylene phosphorothioate.

EXAMPLE 23

Ethyl phosphorochloridothioate+2 - nitroresorcinol= bis(diethyl) 2 - nitro - 1,3 - phenylene phosphorothioate.

EXAMPLE 24

Ethyl phosphorochloridothioate+5 - methylmercaptoresorcinol=bis(diethyl) 5 - methylmercapto - 1,3-phenylene phosphorothioate.

For practical use as insecticides and fungicides, the compounds of this invention are generally incorporated into insecticidal and fungicidal compositions which comprise an inert carrier and a pesticidally toxic amount of such a compound. Such insecticidal and fungicidal compositions, which are usualy known in the art as formulations, enable the active compound to be applied conveniently to the site of the pest infestation in any desired quantity. These compositions can be solids such as dusts, granules, or wettable powders; or they can be liquids such as solutions or emusificable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. However, preferred liquid compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the pest infestation. The emulsifiers most commonly used in these concentrates are nonionic or mixtures of nonionic with anionic surface-active agents.

A typical insecticidal and fungicidal composition according to this invention is illustrated by the following example, in which the quantities are in parts by weight.

EXAMPLE 25

*Preparation of a dust*

Product of Example 1 _____ 10
Powdered talc _____ 90

The above ingredients are mixed in a mechanical grinder-blender and are ground until a homogeneous, free-flowing dust of the desired particle size is obtained. This dust is suitable for direct application to the site of the pest infestation.

The insecticides and fungicides of this invention can be applied in any manner recognized by the art. The concentration of the new compounds of this invention in the insecticidal and fungicidal compositions will vary greatly with the type of formulation and the purpose for which it is designed, but generally the compositions will comprise from about 0.05 to about 95 percent by weight of the active compounds of this invention. In a preferred embodiment of this invention, the compositions will comprise from about 5 to about 75 percent by weight of the active compound. The compositions can also comprise such additional substances as other pesticides, spreaders, adhesives, stickers, fertilizers, activators, synergists, and the like.

The insecticides and fungicides of this invention can this invention can be illustrated by many of the recognized testing techniques known to the art. For example, a series of tests was carried out in which the test compounds were formulated at a concentration of 0.35% on a weight/volume basis, with 100 ml. distilled water, 0.5 ml. benzene as solvent, and 0.5 ml. Triton X–100 (an alkyl aryl polyether alcohol emulsifier). In tests on houseflies, fifty adults of the Chemical Specialties Manufacturers' Association strain were sprayed with the test emulsion in a 2 x 5 inch diameter stainless steel cage faced on top and bottom with 14-mesh screen. The flies were retained in the cage in which they were sprayed for knockdown observations and 24-hour mortality determinations. The results are summarized in the following table:

| Compound | Percent knockdown | |
|---|---|---|
| | 2 hrs. | 24 hrs. |
| Bis(diethyl)2,5-dichloro-1,4-phenylene phosphorothioate | 100 | 100 |
| Bis(diethyl) 2-chloro-1,4-phenylene phosphorothioate | 100 | 100 |
| Bis(diethyl) 4,6-dichloro-1,3-phenylene phosphorothioate | 100 | 100 |
| Bis(dimethyl) 2-chloro-1,4-phenylene phosphorothioate | 100 | 100 |
| Bis(dimethyl) 2,5-dichloro-1,4-phenylene phosphorothioate | 100 | 96 |
| Untreated | 0 | 0 |

In another series of tests, lima bean leaves sprayed on the dorsal and ventral surfaces were offered to ten larvae of the southern armyworm (late third instar) and the Mexican bean beetle (late second instar) for a 48-hour feeding period. The feeding rate and mortality data, as well as any foliage injury, were recorded. In the tests on the southern armyworm, bis(diethyl) 4,6-dichloro-1,3-phenylene phosphorothioate and bis (dimethyl) 2-chloro-1,4-phenylene phosphorothioate, both caused 100% mortality of this insect. In the tests on the Mexican bean beetle, the compounds bis(diethyl) 2,5-dichloro-1,4-phenylene phosphorothioate, bis(diethyl) 2-chloro-1,4-phenylene phosphorothioate, and bis(dimethyl) 2-chloro-1,4-phenylene phosphorothioate caused 90%, 100% and 100% mortalities, respectively, of this insect. Many of the compounds of this invention also showed activity against the pea aphid.

The new compounds of this invention are fungicidal in their ability to kill, inhibit or inactivate a fungus so that it does not grow. Practically, these compounds can be used to prevent fungi and molds from harming cloth, wood, plants, animals, or whatever else they attack. The fungicidal compound should preferably be applied before the infection has occurred and certainly before it has progressed very far.

When the compounds of this invention are used as agricultural fungicides, they can be applied to plant foliage, to seeds, to the soil, or to such parts of plants as the fruits themselves. Plants are susceptible to a great many diseases which cause widespread damage; and among some of the more important which can be mentioned are late blight on tomato, powdery mildew on cucumber, cereal leaf rust on wheat, and such common soil fungi as fusarium wilt (*Fusarium oxysporum*), the seed rot fungus *Phythium debaranum,* and the sheath and culm blight *Rhizoctonia solani.* The new compounds of this invention can also be employed as industrial fungicides to control a variety of fungi which attack such materials as adhesives, cork, paints, lacquers, leather, wood, plastics, and textiles such as cotton and wool.

The quantity of active compound of this invention to be used for good disease control will depend on a variety of factors, such as the particular disease involved, the intensity of the infestation, formulation, weather, type of crop and the like. Thus, while the application of only one or two ounces of active compound per acre of a crop may be sufficient to control a light infestation of certain fungi, a pound or more of active compound per acre may be required to control a heavy infestation of a hardly species of fungus.

The new compounds of this invention can be used in many ways for the control of insects. Insecticides which are to be used as stomach poisons or protective materials can be applied to the surface on which the insects feed or travel. Insecticides which are to be used as contact poisons or eradicants can be applied directly to the body of the insect, as a residual treatment to the surface on which the insect may walk or crawl, or as a fumigant treatment of the air which the insect breathes. In some cases, the compounds applied to the soil or plant surfaces are taken up by the plant, and the insects are poisoned systematically.

The above methods of using insecticides are based on the fact that almost all the injury done by insects is a direct or indirect result of their attempts to secure food. Indeed, the large number of destructive insects can be classified broadly on the basis of their feeding habits. There are, for example, the chewing insects such as the Mexican bean beetle, the southern armyworm, cabbageworms, grasshoppers, the Colorado potato beetle, the cankerworm, and the gypsy worm. There are also the piercing-sucking insects, such as the pea aphid, the housefly, the chinch bug, leafhoppers, and plant bugs.

Another group of insects comprises the internal feeders. These include borers such as the European corn borer and the corn earworm; worms or weevils such as the codling moth, cotton boll weevil, plum curculio, melonworm, and apple maggot; leaf miners such as the apple leaf miner and the beef leaf miner; and gall insects such as the wheat jointworm and grape phylloxera. Insects which attack below the surface of the ground are classified as subterranean insects and include such destructive pests as the wooly apple aphid, the Japanese beetle, and the corn rootworm.

Mites and ticks are not true insects. Many economically important species of mites and ticks are known, including the red spider mite, the strawberry spider mite, the cattle tick, and the poultry mite. Chemicals useful for the control of mits are often called miticides, while those useful for the control of both mites and ticks are known specifically as acaricides.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of a light infestation of an insect under conditions unfavorable for its feeding, while a pound or more of active compound per acre may be required for the control of a heavy infestation of insects under conditions favorable to their development.

I claim:

1. A compound of the general formula

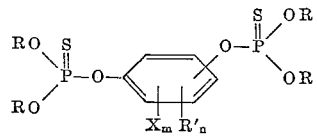

wherein R is lower alkyl; X is selected from the group consisting of chlorine and bromine; R' is selected from the group consisting of lower alkyl; lower alkoxy, nitro, and lower alkylmercapto; $m$ is a whole number from 0 to 2; and $n$ is a whole number from 0 to 1, the sum of $m$ and $n$ being at least one and $m$ is at least one when R' is alkyl.

2. A compound as described in claim 1, wherein R' is lower unsubstituted alkyl, $m$ is a whole number from 1 to 2, and $n$ is one.

3. A compound as described in claim 1, wherein R' is lower unsubstituted alkoxy, $m$ is a whole number from 1 to 2, and $n$ is one.

4. A compound as described in claim 1, wherein $m$ is a whole number from 1 to 2, and $n$ is 0.

5. A compound as described in claim 1, wherein $m$ is 0, R' is lower unsubstituted alkoxy, and $n$ is one.

6. A compound as described in claim 1, wherein $m$ is 0, R' is nitro, and $n$ is one.

7. A compound as described in claim 1, wherein $m$ is 0, R' is lower unsubstituted alkylmercapto, and $n$ is one.

8. Bis(diethyl) 4,6-dichloro-1,3-phenylene phosphorothioate.
9. Bis(dimethyl) 4,6-dichloro-1,3-phenylene phosphorothioate.
10. Bis(diethyl) 2,5-dichloro-1,4-phenylene phosphorothioate.
11. Bis(diethyl) 2-chloro-1,4-phenylene phosphorothioate.
12. Bis(dimethyl) 2-chloro-1,4-phenylene phosphorothioate.
13. Bis(dimethyl) 2,5-dichloro-1,4-phenylene phosphorothioate.
14. Bis(diethyl) 2-chloro-6-methoxy-1,4 - phenylene phosphorothioate.
15. Bis(diethyl) 2-nitro-1,3-phenylene phosphorothioate.
16. Bis(diethyl) 5-methylmercapto-1,3 - phenylene phosphorothioate.

References Cited by the Examiner

UNITED STATES PATENTS

| | | | |
|---|---|---|---|
| 2,643,265 | 6/1953 | Toy | 260—461 |
| 2,719,167 | 9/1955 | Schmidt | 260—461 |
| 2,910,402 | 10/1959 | Fairchild | 167—30 |
| 2,922,812 | 1/1960 | Gilbert | 260—461.103 |
| 3,157,570 | 11/1964 | Reichle | 167—30 |

OTHER REFERENCES

Mandelbaum et al.: J. Gen. Chem. USSR, vol. 23, No. 1 (January–March 1953), pages 437–440.

CHARLES B. PARKER, *Primary Examiner.*

JULIAN S. LEVITT, *Examiner.*

J. D. GOLDBERG, DELBERT PHILLIPS, J. P. BRUST, *Assistant Examiners.*